US008879725B2

(12) United States Patent
Gueron et al.

(10) Patent No.: US 8,879,725 B2
(45) Date of Patent: Nov. 4, 2014

(54) COMBINING INSTRUCTIONS INCLUDING AN INSTRUCTION THAT PERFORMS A SEQUENCE OF TRANSFORMATIONS TO ISOLATE ONE TRANSFORMATION

(75) Inventors: Shay Gueron, Haifa (IL); Zeev Sperber, Zichron Yackov (IL)

(73) Assignee: Intel Corporation, Santa Clara, CA (US)

(*) Notice: Subject to any disclaimer, the term of this patent is extended or adjusted under 35 U.S.C. 154(b) by 1171 days.

(21) Appl. No.: 12/040,214

(22) Filed: Feb. 29, 2008

(65) Prior Publication Data

US 2009/0220071 A1 Sep. 3, 2009

(51) Int. Cl.
*H04K 1/00* (2006.01)
*H04L 9/32* (2006.01)
*H04L 9/06* (2006.01)
*G06F 21/75* (2013.01)

(52) U.S. Cl.
CPC .............. *H04L 9/0681* (2013.01); *G06F 21/75* (2013.01); *G06F 2221/2107* (2013.01)
USPC ................................ 380/28; 380/29; 713/189

(58) Field of Classification Search
CPC ....... H04L 9/06; H04L 9/0618; H04L 9/0625; H04L 9/0631; H04L 9/0687
USPC ............................. 380/28–30; 713/189–190
See application file for complete search history.

(56) References Cited

U.S. PATENT DOCUMENTS

| | | | |
|---|---|---|---|
| 5,295,188 A * | 3/1994 | Wilson et al. | 380/30 |
| 5,375,170 A * | 12/1994 | Shamir | 380/30 |
| 7,961,876 B2 * | 6/2011 | Ding | 380/30 |
| 2004/0054879 A1 * | 3/2004 | Macy et al. | 712/221 |
| 2004/0071291 A1 | 4/2004 | Romain et al. | |
| 2005/0207571 A1 | 9/2005 | Ahn et al. | |
| 2007/0189536 A1 * | 8/2007 | Gammel et al. | 380/259 |

FOREIGN PATENT DOCUMENTS

| | | |
|---|---|---|
| JP | 2003-533829 A | 11/2003 |
| JP | 2009-205161 A | 9/2009 |
| KR | 10-2005-0092576 A | 9/2005 |
| KR | 10-0668664 B1 | 1/2007 |
| WO | 2001/089131 A2 | 11/2001 |

OTHER PUBLICATIONS

Office Action Received for Chinese Patent Application No. 200910128119.6, mailed on Jun. 7, 2010, 3 Pages of English Translation.

(Continued)

*Primary Examiner* — Hosuk Song
(74) *Attorney, Agent, or Firm* — Forefront IP Lawgroup, PLLC

(57) ABSTRACT

The Advanced Encryption Standard (AES) is a symmetric block cipher that can encrypt and decrypt information. Encryption (cipher) performs a series of transformations (Shift Rows, Substitute Bytes, Mix Columns) using the secret key (cipher key) to transforms intelligible data referred to as "plaintext" into an unintelligible form referred to as "cipher text". The transformations (Inverse Shift Rows, Inverse Substitute Bytes, Inverse Mix Columns) in the inverse cipher (decryption) are the inverse of the transformations in the cipher. Encryption and decryption is performed efficiently through the use of instructions that perform the series of transformations. Combinations of these instructions allow the isolation of the transformations (Shift Rows, Substitute Bytes, Mix Columns, Inverse Shift Rows, Inverse Substitute Bytes, Inverse Mix Columns) to be obtained.

14 Claims, 7 Drawing Sheets

(56) References Cited

OTHER PUBLICATIONS

Gueron, Shay, et al., "Flexible architecture and instruction for advanced encryption standard (AES)", assigned U.S. Appl. No. 11/729,199, filed Mar. 28, 2007.

A. Menezes, et al., "Handbook of Applied Cryptography", Ch. 7—Block Ciphers, CRC Press. Inc. 1997 (61 pgs.).

Office Action Received for Korean Patent Application No. 10-2009-17253, mailed on Sep. 30, 2010, 4 pages of English Translation.

Daemen, et al., "Specification of Rijndael", The Design of Rijndael, AES—The Advanced Encryption Standard, Springer, XP007910936. ISBN: 978-3-540-42580-9, Jan. 1, 2002, 23 pages.

European Search Repor Received for European Patent Application No. 09250543.7, mailed on Dec. 27, 2011, 5 pages.

Office Action Received for Chinese Patent Application No. 200910128119.6, mailed on May 4, 2011, 5 pages, of English Translation and 4 pages of Chinese Office Action.

Office Action Received for Japanese Patent Application No. 2009-045094, mailed on Oct. 4, 2011, 5 pages of English Translation and 4 pages of Japanese Office Action.

Amada et al., "Improvement of Fast Software Implementation of Block Ciphers", Technical Report of IEICE, Japan, The Institute of Electronics, Information and Communication Engineers, vol. 97, No. 71, May 26, 1997, pp. 107-119 (English Translation not available).

Brickell et al., "Software mitigations to hedge AES against cache-based software side channel vulnerabilities", Cryptology ePrint Archive: Report 2006/052,[online], Version: 20060214: 163143, Feb. 14, 2006,17 pages.

Bielecki et al., "Parallelization of the AES Algorithm", Proceedings of the 4th WSEAS Int. Conf. on Information Security, Communications and Computers, Dec. 16-18, 2005, pp. 224-228.

Gueron, "Intel's New AES Instructions for Enhanced Performance and Security", Fast Software Encryption, 16th International Workshop, FSE 2009, Lecture Notes in Computer Science 5665, 2009, pp. 51-66.

Yoo, et al., "An AES crypto chip using a high-speed parallel pipelined architecture", ScienceDirect, Microprocessors and Microsystems, ELSEVIER, vol. 29, No. 1, Sep. 2005, pp. 317-326.

Satoh, et al., "A Compact Rijndael Hardware Architecture with S-Box Optimization", ASIACRYPT '01 Proceedings of the 7th International Conference on the Theory and Application of Cryptology and Information Security: Advances in Cryptology, Lecture Notes in Computer Science 2248, 2001, pp. 239-254.

Office Action received for European Patent Application No. 09250543.7, mailed on Jan. 17, 2012, 5 pages.

Office Action Received for Chinese Patent Application No. 200910128119.6, mailed on Apr. 12, 2012, 11 pages of English Translation and 7 pages of Chinese Office Action.

Office Action received for Chinese Patent Application No. 200910128119.6, mailed on Nov. 21, 2012, 14 pages of English Translation and 8 pages of Chinese Office Action.

Office Action Received for European Patent Application No. 09250543, Mailed on Apr. 18, 2013, 7 pages.

Office Action received for Japanese Patent Application No. 2009-045094, mailed on Dec. 18, 2012, 3 pages of English Translation and 3 pages of Offce Action.

Atasu et al., "An Integer Linear Programming Approach For Identifying Instruction-Set Extensions", Proceedings of the 3rd IEEE/ACM/IFIP international conference on Hardware/software codesign and system synthesis, 2005, pp. 172-177.

Jones, W. Douglas, "A Minimal CISC", ACM SIGARCH Computer Architecture News, vol. 16 Issue 3, Mar. 17, 1988, pp. 56-63.

Office Action received for Chinese Patent Application No. 200910128119.6, mailed on May 2, 2013, 15 pages of English Translation and 9 pages of Chinese office Action.

Notice of Allowance received for Japanese Patent Application No. 2009-045094 mailed on Apr. 1, 2014, 2 pages.

Office Action received for Japanese Patent Application No. 2009-045094, mailed on Oct. 15, 2013, 2 pages of Office Action and 2 pages for English translation.

* cited by examiner

US 8,879,725 B2

COMBINING INSTRUCTIONS INCLUDING AN INSTRUCTION THAT PERFORMS A SEQUENCE OF TRANSFORMATIONS TO ISOLATE ONE TRANSFORMATION

FIELD

This disclosure relates to Advanced Encryption Standard (AES) and in particular to using a combination of instructions including an instruction that performs a subset of a sequence of transformations for AES to provide the result of one of the AES transformations.

BACKGROUND

Cryptology is a tool that relies on an algorithm and a key to protect information. The algorithm is a complex mathematical algorithm and the key is a string of bits. There are two basic types of cryptology systems: secret key systems and public key systems. A secret key system also referred to as a symmetric system has a single key ("secret key") that is shared by two or more parties. The single key is used to both encrypt and decrypt information.

The Advanced Encryption Standard (AES), published by the National Institute of Standards and Technology (NIST) as Federal Information Processing Standard (FIPS) 197 is a secret key system. AES is a symmetric block cipher that can encrypt and decrypt information.

Encryption (cipher) performs a series of transformations using the secret key (cipher key) to transform intelligible data referred to as "plaintext" into an unintelligible form referred to as "cipher text". The transformations in the cipher include: (1) Adding a round key (value derived from the cipher key) to the state (a two dimensional array of bytes) using a Exclusive OR (XOR) operation; (2) Processing the state using a non-linear byte substitution table (S-Box); (3) Cyclically shifting the last three rows of the state by different offsets; and (4) Taking all of the columns of the state and mixing their data (independently of one another) to produce new columns.

Decryption (inverse cipher) performs a series of transformations using the cipher key to transform the "cipher text" blocks into "plaintext" blocks of the same size. The transformations in the inverse cipher are the inverse of the transformations in the cipher.

The Rijindael algorithm is specified in the AES standard to process data blocks of 128 bits, using cipher keys with lengths of 128, 192 and 256 bits. The different key lengths are typically referred to as AES-128, AES-192 and AES-256.

The AES algorithm transforms the plaintext into cipher text or cipher text into plaintext in 10, 12, or 14 consecutive rounds, with the number of rounds dependent on the length of the key.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
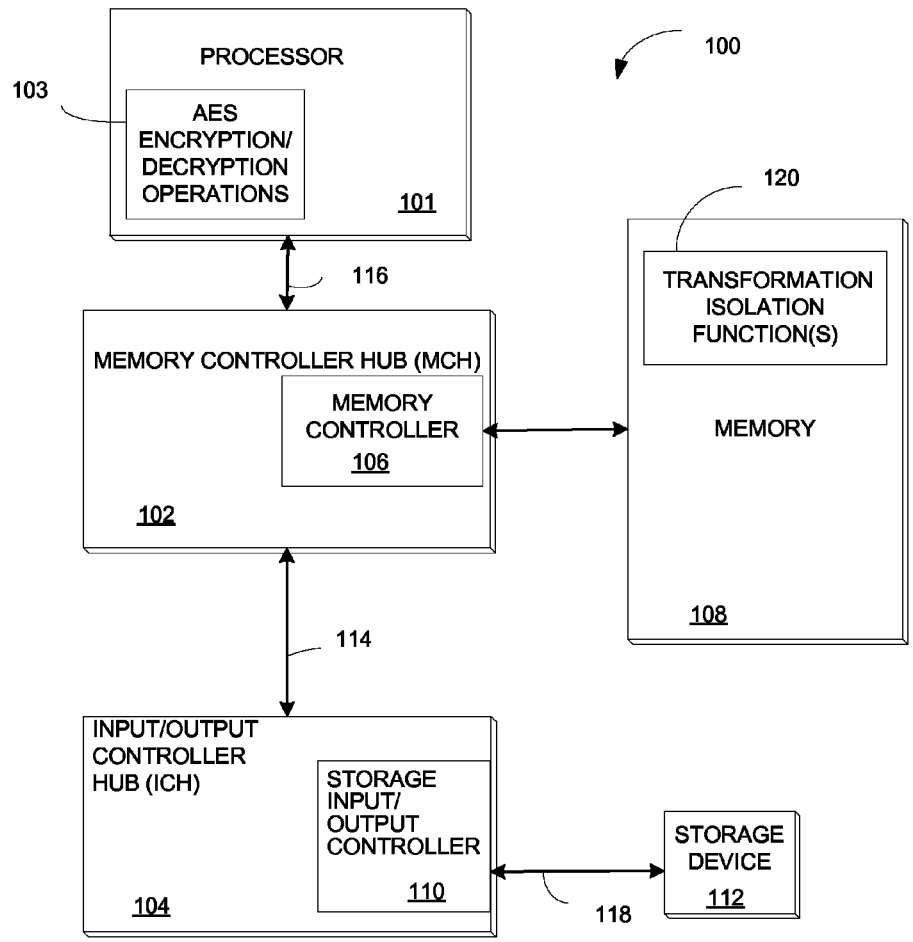
FIG. 1 is a block diagram of a system that includes instructions for performing AES encryption and decryption in a general purpose processor.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

The Advanced Encryption Standard (AES) algorithm published by the National Institute of Standards and Technology (NIST) as Federal Information Processing Standard (FIPS) 197 is a compute intensive algorithm that is typically performed in software or in a special purpose processor. The AES algorithm is performed in software by executing a sequence of load/store/increment Central Processing Unit (CPU) instructions stored in a memory. The transformation is slow because the AES algorithm consumes many CPU cycles to transform each byte of plaintext or cipher text. Thus, encryption is typically only used for encrypting a subset of the information stored in computers, for example, information that may be classified as "top secret". However, there is a need to encrypt more of the information that is stored on computers. For example, if all information stored on a mobile computer was encrypted, this information would be protected in the event that the mobile computer was stolen.

AES is a block cipher that operates on a 128-bit block with a key size of 128, 192 or 256 bits. The AES algorithm transforms a 128-bit plaintext block into a 128-bit block of cipher text (encrypts) or a 128-bit block of cipher text into a 128-bit block of plaintext (decrypts) in 10, 12, or 14 consecutive rounds, with the number of rounds dependent on the key size (128, 192 or 256-bits). A sequence of transformations (sub-steps) is iterated for each round (10, 12 or 14).

The sequence of transformations for an encryption round includes:

(1) An AddRoundKey Transformation: A round key (value derived from the cipher key) is added to the state (a two dimensional 128-bit array of bytes) using an Exclusive OR (XOR) operation. AddRoundKey is a (128-bit, 128-bit)→128-bit transformation which is defined is a bit-wise eXclusive OR (XOR) of its two arguments. In the AES flow, the arguments are the State and the round key.

(2) A SubBytes Transformation: The state is processed using a non-linear byte substitution table (S-Box). SubBytes is the 16 bytes to 16 bytes (byte-wise) transformation defined by applying an S-box transformation to each one of the 16 bytes of an input. The S-box transformation can be represented via a lookup table as follows: The input to the lookup table is a byte B[7:0] where x and y denote low and high nibbles x[3:0]=B[7:4], y[3:0]=B[3:0]. The output byte is encoded in the table as a two digit number in hexadecimal (H) notation. For example, input 85H yields 97H.

(3) A ShiftRows Transformation: The last three rows of the state are cyclically shifted by different offsets. ShiftRows is the following byte-wise permutation: (15, 14, 13, 12, 11, 10, 9, 8, 7, 6, 5, 4, 3, 2, 1, 0)→(11, 6, 1, 12, 7, 2, 13, 8, 3, 14, 9, 4, 15, 10, 5, 0). The transformation is viewed as an operation on a 4×4 matrix representation of the state. The first row in the 4×4 matrix is unchanged. The second row is left rotated by one byte position. The third row is left rotated by two byte positions. The fourth row is left rotated by three byte positions.

(4) MixColumns Transformation: The data from all of the columns of the state is mixed (independently of one another) to produce new columns. MixColumns is a 128-bit→128-bit transformation operating on the columns of the 4×4 matrix representation of the input. The transformation treats each column as a third degree polynomial with coefficients in AES-Galois Field 256. Each column of the 4×4 matrix representation of the state is multiplied by polynomial $a(x)=\{03\}x^3+\{01\}x^2+\{01\}x+\{02\}$ and reduced modulo $x^4+1$.

The sequence of transformations for an encryption round described above may be performed by a single AES encryption round instruction AESENC as shown below in Table 1 and for a last encryption round by a single AES last encryption round instruction AESENCLAST as shown below in Table 2:

TABLE 1

AESENC xmm1, xmm2/m128
   State = xmm1;
   Round Key = xmm2/m128;
   Tmp=Shift Rows (State);
   Tmp=Substitute Bytes (Tmp);
   Tmp=Mix Columns (Tmp);
   Output = xmm1 = Add Round Key(Tmp, Round Key)

TABLE 2

AESENCLAST xmm1, xmm2/m128
   State = xmm1;
   Round Key = xmm2/m128;
   Tmp=Shift Rows (State);
   Tmp=Substitute Bytes(Tmp);
   Output = xmm1 = Add Round Key(Tmp, Round Key)

The AESENC and AESENCLAST instructions shown in Table 1 and Table 2 perform some sequences of transformations on a State (128 bits specified in an xmm register) and a Round Key (128 bits specified in an xmm register or as a memory pointer), or on a key (128, or 192 or 256 bits specified in xmm registers and/or memory). These instructions produce a 128 bit output. The corresponding sequences of 128 bits→128 bits transformations are described, using the terminology of FIPS publication 197.

The AES instructions (AESENC, AESENCLAST) shown in Tables 1 and 2 above process the data stored in the 128-bit variable (temp) (also referred to as the state) serially, as defined by the FIPS Publication 197. An example of the serial sequence of operations for processing N blocks of data is shown below in Table 3.

TABLE 3

For i from 1 to N_BLOCKS do
   xmm1 = BLOCK [i] // load
   xmm1 = AESENC (xmm1, RK [1])

TABLE 3-continued xmm1 = AESENC (xmm1, RK [2])
   xmm1 = AESENC (xmm1, RK [3])
   ...
   xmm1 = AESENC (xmm1, RK [9])
   xmm1 = AESENCLAST(xmm1, RK [10])
   store xmm1
End For each of the N_Blocks to be encrypted, the data block is stored in a register, for example, an xmm register (xmm1) having 128-bits may be used to store a 128-bit block. The 10 encryption rounds are performed in series on the data block. For rounds 1 through 9 of a 10 round AES operation, an AESENC instruction is called to perform the round operations using the round key and the result of the previous round or the initial block data (if round 1). The AESENCLAST instruction is called to process the last round (round 10 in this example).

The sequence of transformations for a decryption round includes:

(1) AddRoundKey Transformation: A round key (value derived from the cipher key) is added to the state (a two dimensional 128-bit array of bytes) using an eXclusive OR (XOR) operation. AddRoundKey is a (128-bit, 128-bit)→128-bit transformation which is defined is a bitwise XOR of its two arguments. In the AES flow, the arguments are the state and the round key.

(2) Inverse Substitute Bytes (SubBytes) Transformation: The state is processed using an inverse non-linear byte substitution table (S-Box). Inverse Substitute Bytes is a 16-byte→16-byte (byte-wise) transformation defined by applying an InvS-Box function to each byte of the input, namely [P,O,N,M,L,K,J,I,H,G,F,E,D,C,B,A]→[InvS-Box (P), InvS-Box (O), InvS-Box (N), InvS-Box (M), InvS-Box (L), InvS-Box (K), InvS-Box (J), InvS-Box (I), InvS-Box (H), InvS-Box (G), InvS-Box (F), InvS-Box (E), InvS-Box (D), InvS-Box (C), InvS-Box (B), InvS-Box (A)].

(3) Inverse ShiftRows Transformation: This transformation is the inverse of the ShiftRows transformation. The Inverse ShiftRows Transformation is the following byte-wise permutation: (15, 14, 13, 12, 11, 10, 9, 8, 7, 6, 5, 4, 3, 2, 1, 0)→(3, 6, 9, 12, 15, 2, 5, 8, 11, 14, 1, 4, 7, 10, 13, 0). In the P-A notation it reads [P,O,N,M,L,K,J,I,H,G,F,E,D,C,B,A]→[D, G,J,M,P,C,F,I,L,O,B,E,H,K,N,A].

(4) Inverse MixColumns transformation is a 128-bit→128-bit transformation operating on the columns of the 4×4 matrix representation of the input. The transformation treats each column in the 4×4 matrix as a third degree polynomial with coefficients in AES-GF256-Field. Each column of the 4×4 matrix representation of the state is multiplied by polynomial $a^{-1}(x)=\{0b\}x^3+\{0d\}x^2+\{09\}x+\{0e\}$ and reduced modulo $x^4+1$.

The sequence of transformations for a decryption round described above may be performed by a single AES decryption round instruction AESDEC as shown below in Table 4 and for a last decryption round by a single AES last decryption round instruction AESDECLAST as shown below in Table 5:

The AESDEC and AESDECLAST instructions shown in Table 4 and Table 5 below perform some sequences of transformations on a State (128 bits specified in an xmm register) and a Round Key (128 bits specified in an xmm register or as a memory pointer), or on a key (128, or 192 or 256 bits specified in xmm registers and/or memory). These instructions produce a 128 bit output. The corresponding sequences of 128 bit→128 bit transformations are described, using the terminology of FIPS publication 197.

TABLE 4

AESDEC xmm1, xmm2/m128
  State = xmm1;
  Round Key = xmm2/m128;
  Tmp=Inverse Shift Rows (State);
  Tmp=Inverse Substitute Bytes (Tmp);
  Tmp=Inverse Mix Columns (Tmp=);
  Output = xmm1 = Add Round Key (Tmp=, Round Key)

TABLE 5

AESDECLAST xmm1, xmm2/m128
  State = xmm1;
  Round Key = xmm2/m128
  Tmp=Inverse Shift Rows (State);
  Tmp=Inverse Substitute Bytes (Tmp);
  Output = xmm1 = Add Round Key (Tmp, Round Key)

Each of the four AES round instructions (AESENC, AESNECLAST, AESDEC, AESDECLAST) shown in Tables 1, 2, 4 and 5 increases performance by performing several AES transformations together. However, the instructions only support the current version of the AES standard.

An embodiment of the present invention uses combinations of instructions including AES encryption and decryption instructions to obtain the sub-steps (transformations) of the AES algorithm as isolated transformations. The isolated transformations include: Shift Rows, Substitute Bytes and Mix Columns transformations used by the encryption AES instructions (AESENC, AESENCLAST) and Inverse Shift Rows, Inverse Substitute Bytes and Inverse Mix Columns transformations used by decryption AES instructions (AESDEC, AESDECLAST).

The ability to isolate the transformations adds flexibility to the use of the AES encrypt and decrypt instructions. For example, the ability to obtain the sub-steps (transformations) of the AES algorithm allows AES variants to be constructed and allows possible future modifications in the AES standard to be supported. It also allows the AES primitives (transformations) to be used as building blocks to other ciphers and to cryptographic hash functions.

FIG. 1 is a block diagram of a system 100 that includes instructions for performing AES encryption and decryption in a general purpose processor. The system 100 includes a processor 101, a Memory Controller Hub (MCH) or (Graphics Memory Controller Hub (GMCH)) 102 and an Input/Output (I/O) Controller Hub (ICH) 104. The MCH 102 includes a memory controller 106 that controls communication between the processor 101 and memory 108. The processor 101 and MCH 102 communicate over a system bus 116.

The processor 101 may be any one of a plurality of processors such as a single core Intel® Pentium IV® processor, a single core Intel Celeron processor, an Intel® XScale processor or a multi-core processor such as Intel® Pentium D, Intel® Xeon® processor, or Intel® Core® Duo processor or any other type of processor.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes.

The ICH 104 may include a storage I/O controller 110 for controlling communication with at least one storage device 112 coupled to the ICH 104. The storage device may be, for example, a disk drive, Digital Video Disk (DVD) drive, Compact Disk (CD) drive, Redundant Array of Independent Disks (RAID), tape drive or other storage device. The ICH 104 may communicate with the storage device 112 over a storage protocol interconnect 118 using a serial storage protocol such as, Serial Attached Small Computer System Interface (SAS) or Serial Advanced Technology Attachment (SATA).

The processor 101 includes an AES function 103 to perform AES encryption and decryption operations. The AES function 103 may be used to encrypt or decrypt information that may be stored in memory 108 and/or stored in the storage device 112.

Transformation isolation function(s) 120 that may be stored in memory 108 or in the storage device 112 use the AES function 103 to isolate one of the transformations in the AES encrypt or decrypt instructions. The transformation isolation function(s) 120 will be described later in conjunction with FIGS. 3-7.

Figure 2:
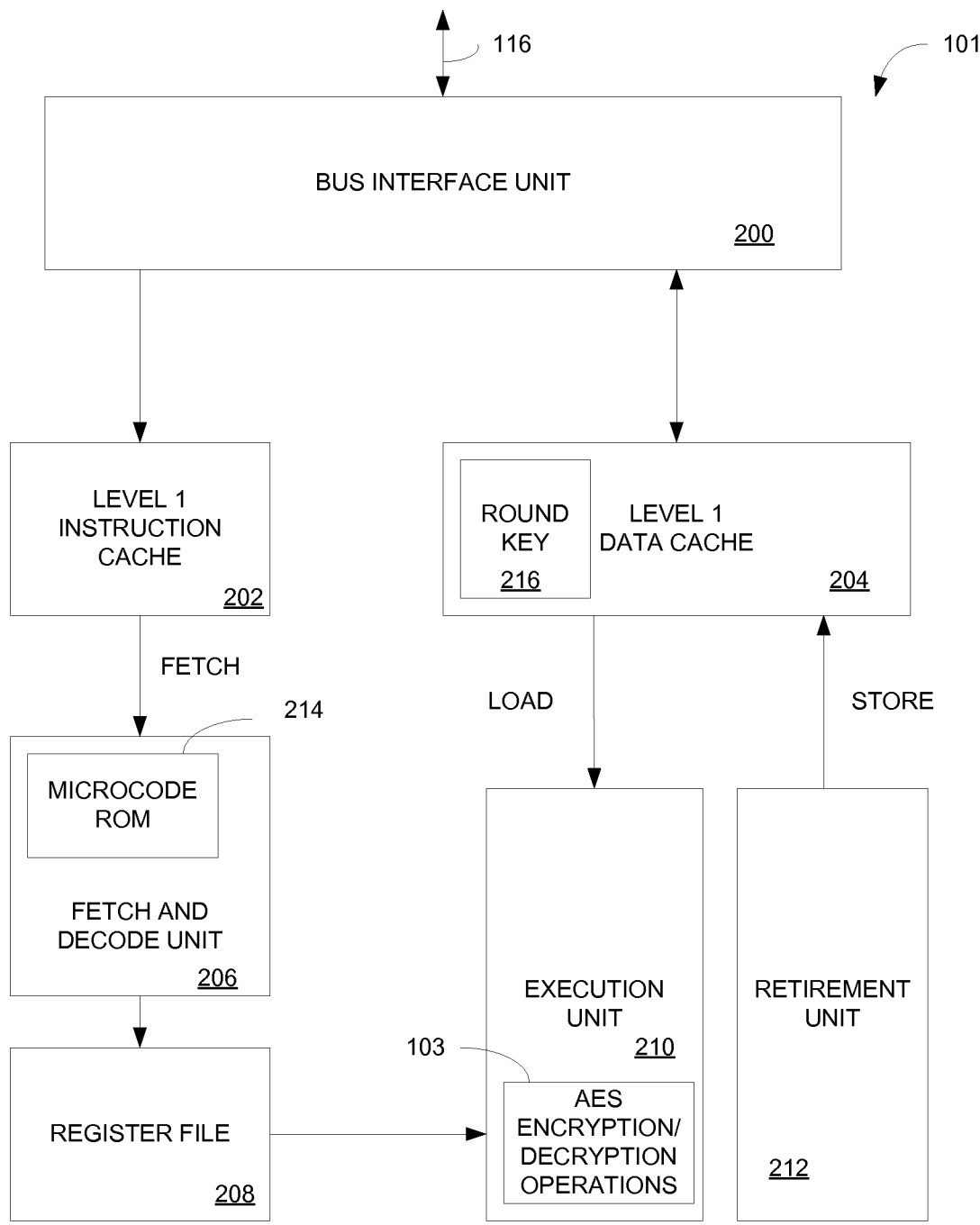
FIG. 2 is a block diagram of an embodiment of the processor shown in FIG. 1.

FIG. 2 is a block diagram of an embodiment of the processor 101 shown in FIG. 1. Processor 101 includes a fetch and decode unit 206 for decoding processor instructions received from a Level 1 (L1) instruction cache 202. Data to be used for executing the processor instructions may be stored in a register file 208. In one embodiment, the register file 208 includes a plurality of 128-bit registers, which are used by an AES round instruction to store data for use by the AES round instruction.

In one embodiment, the register file 208 is a group of 128-bit registers similar to the 128-bit MMX registers provided in Intel Pentium MMX Processors that have a Streaming (Single Instruction Multiple Data (SIMD)) Extension (SSE) Instruction set. In a SIMD processor, data is processed in 128-bit blocks with one 128-bit block loaded at one time.

The fetch and decode unit 206 fetches macroinstructions from L1 instruction cache 202, decodes the macroinstructions and breaks them into simple operations called micro operations (pops) that may be stored in microcode Read Only Memory (ROM) 214. The execution unit 210 which is pipelined, schedules and executes the micro operations. In the embodiment shown, the AES function 103 in the execution unit 210 includes micro operations for a set of AES round instructions including AES encrypt/decrypt round instructions. The AES round instructions are fully pipelined so that the processor (CPU) may dispatch an instruction in every cycle, if there is data ready to process. The retirement unit 212 writes the results of the executed instructions to registers or memory. A round key 216 used by an AES round instruction may be stored in L1 data cache 204 and loaded into the execution unit 210 for use by the micro operations to execute any of one of the AES encrypt/decrypt round instructions. Storing the round key 216 in the L1 data cache 204 protects the round key 216 from side channel attacks, for example, attempts to obtain the round key in order to get access to encrypted information stored in the system 100.

After an AES round instruction has been decoded by the fetch and decode unit 206, the execution of an AES round instruction by the execution unit 210 involves performing the micro operations associated with the AES round instruction that may be stored in the microcode ROM 214.

In an embodiment, an AES round instruction set is provided that includes separate AES round instructions for performing an encryption round, a decryption round, an encryption last round and a decryption last round. In an embodiment, each AES round instruction has a unique operation code (opcode).

As already discussed in conjunction with Tables 1, 2, 4 and 5, the AES instruction set includes four AES round instructions (encrypt, decrypt, encrypt last round, decrypt last round). The AES round instructions in the AES instruction set include single round operations to perform encryption and decryption round operations that are to be used for all rounds but the last round.

For example, in the AESENC single round instruction shown in Table 1, the input data is stored in a 128-bit register (xmmsrcdst) and the round key stored in another 128-bit register (Xmm). This instruction performs an AES round operation on input data (source) that is stored in the 128-bit xmmsrcdst register and overwrites the input data stored in the 128-bit xmmsrcdst register with the result of the execution of the round operation. Thus xmmsrcdst first stores the input data and later stores the result of the AES round operation.

For example, in the AESENCLAST single round instruction shown in Table 2, the input data is stored in a 128-bit register (xmmsrcdst) and the round key stored in another 128-bit register (Xmm). This instruction performs an AES round operation on input data (source) that is stored in the xmmsrcdst register and overwrites the input data stored in the xmmsrcdst register with the result of the execution of the round operation. Thus xmmsrcdst first stores the input data and later stores the result of the round operation. The Xmm register stores the round key for the round operation.

The size of the key may be 128-bits, 192-bits or 256-bits. The number of rounds to be performed (n) may be 1, 10, 12 or 14 dependent on the size of the key with each round key being a fixed size (128-bits). With a number of rounds value of 10, 12, 14, the AES micro operations may perform standard AES encryption and decryption for key sizes of 128-bits, 192-bits or 256-bits.

When the same key is used for many blocks, the round key for each round (key schedule) may be pre-computed and stored in memory (for example, round key 216 in level 1 data cache 204). Round key 216 may include an array (RK) having 10 elements to store the key schedule for the key. The input key for AES-128 encryption is stored in RK[0] and the 9 round keys RK[0]-RK[1] are pre-computed.

In an embodiment, the register file 304 has a plurality of 128-bit registers which may be used by the AES instructions. The 128-bit registers may store source operand(s), round keys and the result of an AES instruction. For the first round, the AES instruction receives a source operand that may be 128-bits of plaintext to be encrypted or 128-bits of cipher text to be decrypted.

In an embodiment of the present invention, the set of AES instructions (AESINC, AESDEC, AESENCLAST, AESDECLAST) described earlier may be used to isolate the sub-steps (transformations) of the AES algorithm defined by FIPS 197. The sub-steps are Shift Rows, Substitute Bytes, Mix Columns, Inverse Shift Rows, Inverse Substitute Bytes, and Inverse Mix Columns.

The six sub-steps (transformations) operate on a 128 bit State and produce a 128 bit result. The "Inverse" transformations are the corresponding inverses of the transformations, for example, if Tmp=Substitute Bytes (State), then Inverse Substitute Bytes (Tmp)=State. The Add Round Key transformation operates on two 128 bits inputs (State and Round Key), and outputs their bitwise XOR.

Figure 3:
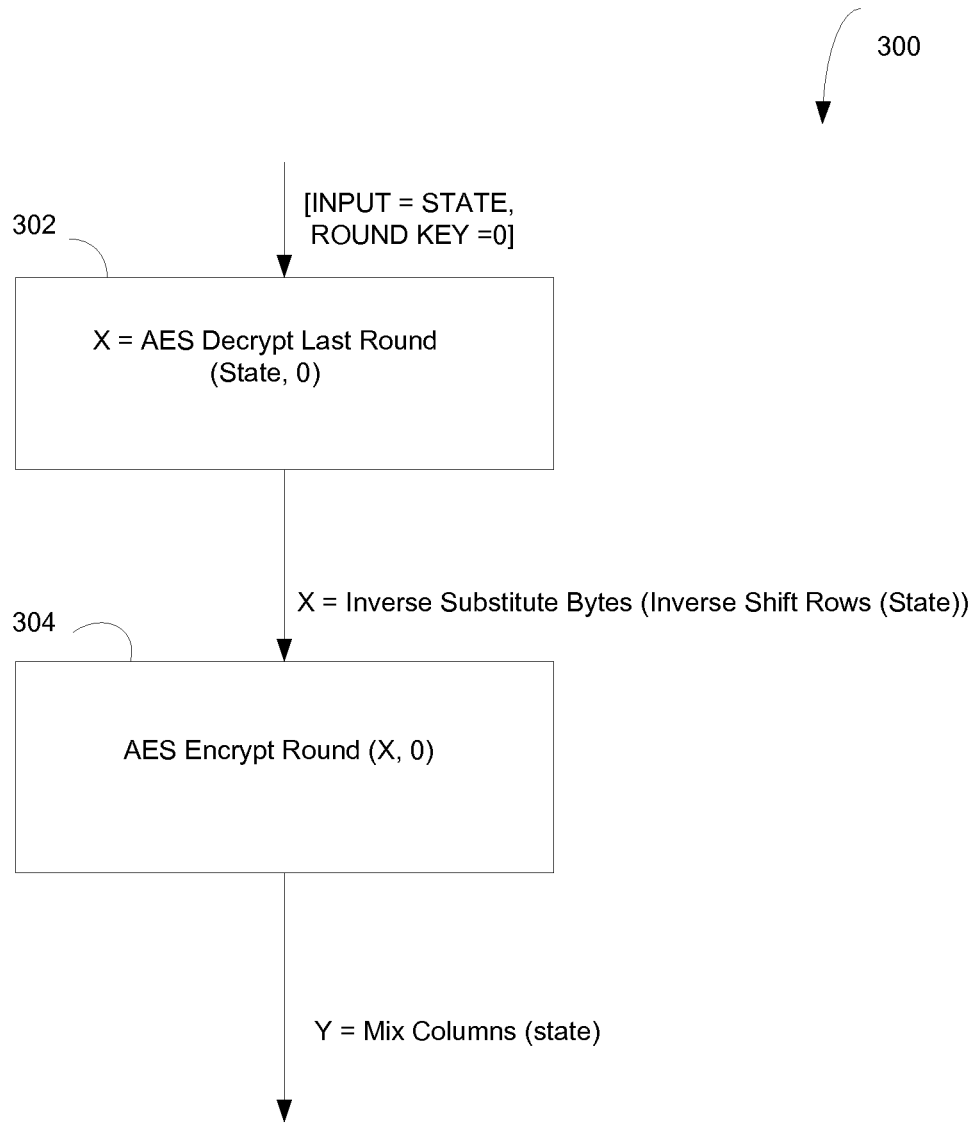
FIG. 3 is a flow chart of an embodiment of a Mix Column isolation transformation function using at least one AES round instruction for isolating the Mix Columns transformation in the AES algorithm.

FIG. 3 is a flow chart of an embodiment of a Mix Column isolation transformation function 300 that uses at least one AES round instruction for isolating the Mix Columns transformation in the AES algorithm.

The micro operation for the Mix Columns transformation is only used in the AESENC instruction shown in Table 1. The AESDEC instruction includes the inverse transformations to the transformations in the AESENC instruction.

At block 302, the Mix Columns transformation isolation function calls the AESDECLAST instruction with the current state and the round key set to 0. The AESDECLAST performs the micro-operations shown below in Table 6:

TABLE 6

Tmp = Inverse Shift Rows (State)
Tmp = Inverse Substitute Bytes (Tmp)
Tmp = AddRoundKey (Tmp, Round Key)

First an Inverse Shift Rows transformation is performed on the State and the result of the transformation is stored in Tmp. Next, an Inverse Substitute Bytes transformation is performed on the contents of Tmp and the result is stored in Tmp. Finally, an AddRoundKey transformation is performed on the contents of Tmp and the Round Key which is set to 0. The AddRoundKey micro-operation is basically a NOP (no operation) as an exclusive OR operation is performed on the contents of Tmp and 0 and the result is the contents of Tmp. The output X of the AESENCLAST instruction is then provided as an input to the AESENC instruction.

At block 304, the AESENC instruction receives the result (X) of the AESDECLAST instruction. The result X is Inverse Substitute Bytes (Inverse Shift Rows (State)), that is, the result of the two transformations: Inverse Substitute Bytes and Inverse Shift Rows on the State. The inputs to AESINC instruction are the result of the AESDECLAST instruction and round key set to 0. The AESENC instruction performs the micro-operations shown below in Table 7.

TABLE 7

Tmp1 = Shift Rows (X)
Tmp1 = Substitute Bytes (Tmp1)
Tmp1 = Mix Columns (Tmp1)
Tmp1 = AddRoundKey (Tmp1, Round Key)

First, a Shift Rows transformation is performed on the input X and the result of the transformation is stored in Tmp. Next, a Substitute Bytes transformation is performed on the contents of Tmp and the result is stored in Tmp. Next, a Mix Columns transformation is performed on the contents of Tmp. Finally, an AddRoundKey transformation is performed on the contents of Tmp and the Round Key which is 0. The AddRoundKey micro-operation is basically a NOP (no operation) as an exclusive OR operation is performed on the contents of Tmp and 0 and the result is the contents of Tmp. The combination of the AESENCLAST instruction and the AESENC instruction isolates the Mix Columns transformation because the AddRoundKey micro-operations perform NOPs, and the other micro-operations (Shift Rows, Substitute Bytes) commute by performing the inverse micro-operations (Inverse Shift Rows, Inverse Substitute Bytes).

Thus, the output of the AESENC instruction is Mix Columns (State) which is isolated using the combination of the AESDECLAST instruction and the AESENC instruction as shown below:

Y=Inverse Mix Columns (Inverse Substitute Bytes (Inverse Shift Rows (Substitute Bytes (Shift Rows (State))))

Figure 4:
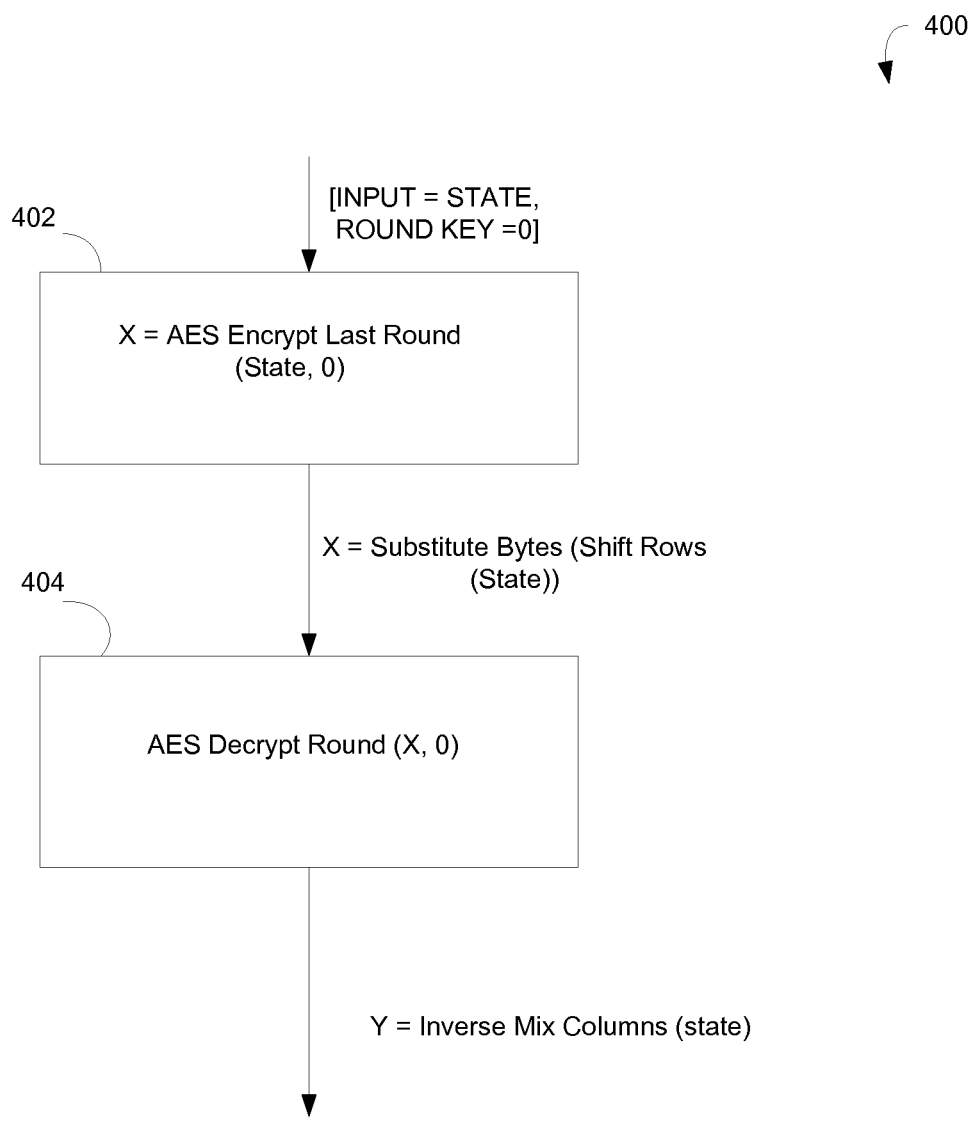
FIG. 4 is a flow chart of an embodiment of an Inverse Mix Column isolation transformation function using at least one AES round instruction for isolating the Inverse Mix Columns transformation in the AES algorithm.

FIG. 4 is a flow chart of an embodiment of an Inverse Mix Column isolation transformation function 400 using at least one AES round instruction for isolating the Inverse Mix Columns transformation in the AES algorithm.

The micro operation for the Inverse Mix Columns transformation is only used in the AESENCLAST instruction shown in Table 2. The AESDEC instruction includes the inverse transformations to the transformations in the AESENC instruction.

At block 402, the first instruction in the Inverse Mix Columns transformation isolation function 400 is the AESENCLAST instruction which is called with the round key set to 0. The AESENCLAST instruction performs the micro-operations shown below in Table 8:

TABLE 8

Tmp = Shift Rows (State)
Tmp = Substitute Bytes (Tmp)
Tmp = AddRoundKey (Tmp, Round Key)

First, a Shift Rows transformation is performed on the State and the result of the transformation is stored in Tmp. Next, a Substitute Bytes transformation is performed on the contents of Tmp and the result is stored in Tmp. Finally, an AddRoundKey transformation is performed on the contents of Tmp and the Round Key which is 0. The AddRoundKey micro-operation is basically a No Operation (NOP) as an exclusive OR operation is performed using the contents of Tmp and 0 with the result of the XOR operation being the original contents of Tmp. The output X of the AESENCLAST instruction is input to the AESECC instruction.

At block 404, the second instruction in the Inverse Mix Columns transformation isolation function is the AESDEC instruction which is provided with the result (X) of the AESENCLAST instruction. The result X is Substitute Bytes (Shift Rows (State)), that is, the result of the two transformations Substitute Bytes and Shift Rows on the state. The inputs to the AESDEC instruction are the result of the AESENCLAST instruction and round key set to 0. The AESDEC instruction performs the micro-operations shown below in Table 9.

TABLE 9

Tmp = Inverse Shift Rows (X)
Tmp = Inverse Substitute Bytes (Tmp)
Tmp = Inverse Mix Columns (Tmp)
Tmp = AddRoundKey (Tmp, Round Key)

First, an Inverse Shift Rows transformation is performed on the input X and the result of the transformation is stored in Tmp. Next, an Inverse Substitute Bytes transformation is performed on the contents of Tmp and the result is stored in Tmp. Then, an Inverse Mix Columns transformation is performed on the contents of Tmp. Finally, an AddRoundKey transformation is performed on the contents of Tmp and the Round Key which is 0. The AddRoundKey micro-operation is basically a NOP (No OPeration) as an exclusive OR operation is performed on the contents of Tmp and 0 and the result is the contents of Tmp.

Thus, the combination of the AESENCLAST instruction and the AESDEC instruction isolates the Inverse Mix Columns transformation because the AddRoundKey micro-operations perform NOPs, and the other micro-operations (Shift Rows, Substitute Bytes) commute by performing the inverse micro-operations (Inverse Shift Rows, Inverse Substitute Bytes). Thus, the output of the AESDEC instruction is Inverse Mix Columns (State) which is isolated by combining the transformations performed by the AESENCLAST instruction and the transformations performed by the AESDEC instruction as shown below:

Y=Inverse Mix Columns (Inverse Substitute Bytes (Inverse Shift Rows (Substitute Bytes (Shift Rows (State))))

Thus, the result of this sequence of two AES round instructions is the isolated Inverse Mix Columns transformation.

Figure 5:
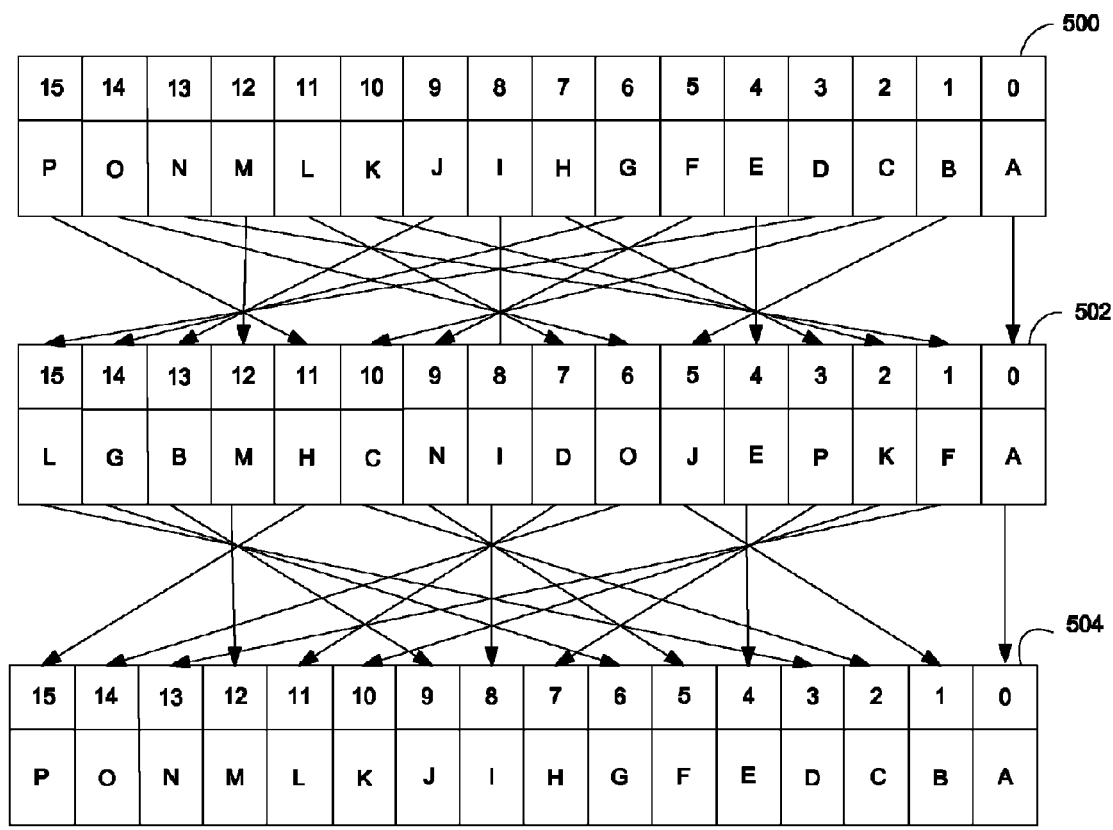
FIG. 5 illustrates use of a Packed Shuffle bytes (PSHUFB) instruction to isolate Shift Rows and the Inverse Shift Rows transformations.

FIG. 5 illustrates use of a Packed Shuffle bytes (PSHUFB) instruction to isolate the Shift Rows and the Inverse Shift Rows transformations. The state 500 has 16 bytes (128-bits) labeled A-L. The PSHUFB instruction has two 128-bit inputs that may be referred to as two registers of bytes A and B. The PSHUFB instruction takes two registers of bytes A=[$a_{15}$ $a_{14}$ $a_{13}$ ... $a_0$] and B=[$b_{15}$ $b_{14}$ $b_{13}$ ... $b_0$] and replaces register A with [$ab_{15}$ $ab_{14}$ $ab_{13}$ ... $ab_0$]. If the top bit of $b_i$ is set to 1, the i-th entry of the result is 0.

In the example shown in FIG. 5, the state 500 corresponds to bytes A=[$a_{15}$ $a_{14}$ $a_{13}$ ... $a_0$]. The result of a Shift Rows transformation is shown in state 502. To perform the Shift Rows transformation, Bytes B=[$b_{15}$ $b_{14}$ $b_{13}$ ... $b_0$] are set to '0B06010C07020D08030E09040F0A0500' (hexadecimal). Bytes[15:0] of the state 500 are moved to bit positions (3, 6, 9, 12, 15, 2, 5, 8, 11, 14, 1, 4, 7, 10, 13, 0) of state 502. For example, byte[0] of state 500 labeled 'A' is moved to byte[0] of state 502 and byte[15] of state 500 labeled 'L' is moved to byte[11] 'B' of state 502.

An Inverse Shift Rows transformation is performed on state 502 using the PSHUSB instruction with bytes A set to state 502 and bytes B set to '0306090C0F0205080B0E0104070A0D00' (hexadecimal). Bytes[15:0] of the state 500 are moved to bit positions (3, 6, 9, 12, 15, 2, 5, 8, 11, 14, 1, 4, 7, 10, 13, 0) of state 502. For example, byte[0] of state 502 labeled 'A' is moved to byte[0] of state 504 and byte[15] of state 500 labeled 'L' is moved to byte[3] of state 504.

Thus, the Shift Rows transformation and the Inverse Shift Rows transformation may be performed using the PSHUFB instruction based on selection of the B bytes, that is, '0B06010C07020D08030E09040F0A0500' (hexadecimal) to perform the Shift Rows transformation and '0306090C0F0205080B0E0104070A0D00' (hexadecimal) to perform the Inverse Shift Rows transformation.

Figure 6:
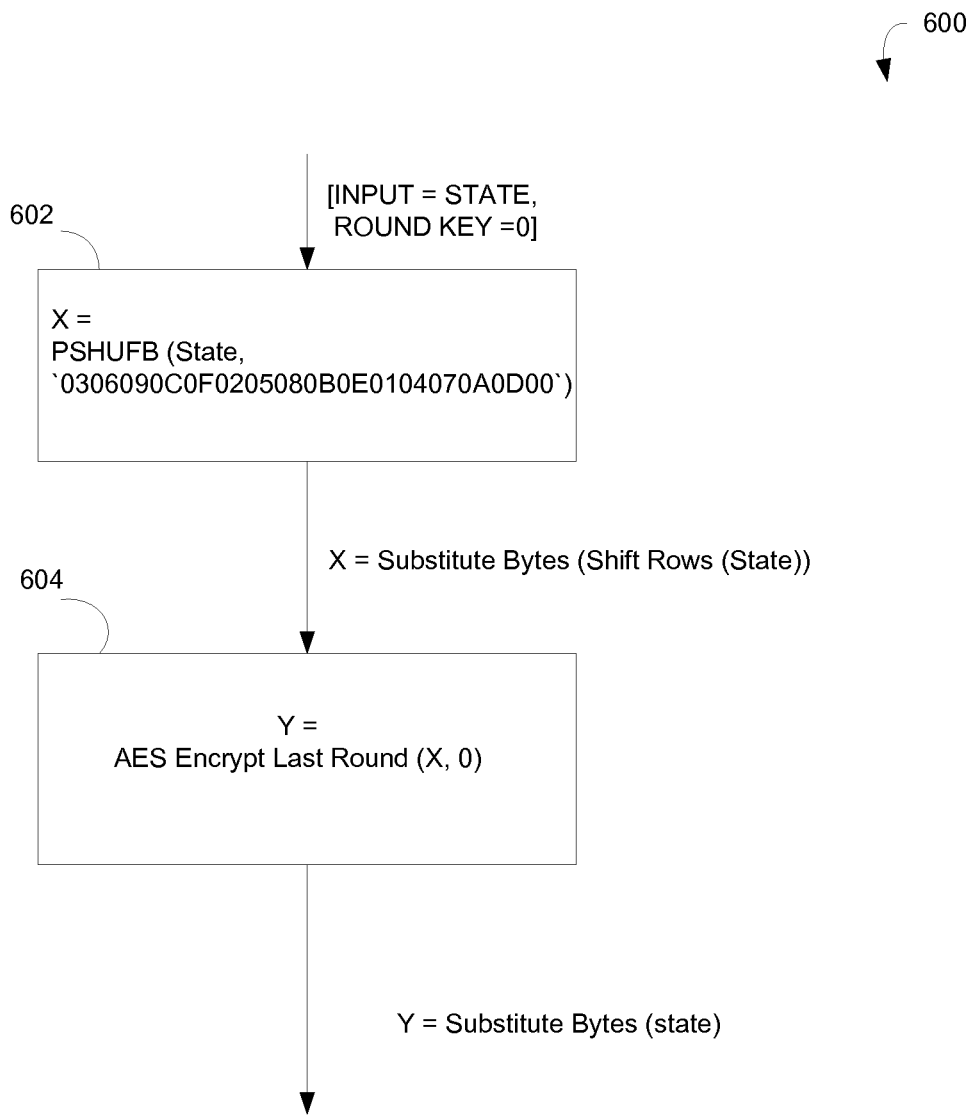
FIG. 6 is a flow chart of an embodiment of a Substitute Bytes isolation transformation function using at least one AES round instruction for isolating the Substitute Bytes transformation in the AES algorithm.

FIG. 6 is a flow chart of an embodiment of a Substitute Bytes isolation transformation function 600 using at least one AES round instruction for isolating the Substitute Bytes transformation in the AES algorithm.

The micro operation for the Substitute Bytes transformation is used in the AESENCLAST instruction shown in Table 2 and in the AESENC instruction shown in Table 1. In the embodiment described in conjunction with FIG. 5, the AESENCLAST instruction is used to isolate the Substitute Bytes transformation.

At block 602, the PSHUFB instruction the Substitute Bytes transformation isolation function 600 is called with the B register set to 0306090C0F0205080B0E0104070A0D00 (hexadecimal) to perform an Inverse Shift Rows on the state. As discussed earlier in conjunction with FIG. 5, the Inverse shift rows transformation performs a permutation of bytes in the state based on the corresponding byte positions stored in the B register.

At block 604, the AESDECLAST instruction in Substitute bytes transformation isolation function 600 is called with the result (X) of the PSHUFB instruction. The inputs to the AESDECLAST instruction are the result of the PSHUFB instruction and round key set to 0. The AESDECLAST instruction performs the micro-operations shown below in Table 10.

TABLE 10

Tmp = Shift Rows (X)
Tmp = Substitute Bytes (Tmp)
Tmp = AddRoundKey (Tmp, Round Key)

First, a Shift Rows transformation is performed on the input X and the result of the transformation is stored in Tmp. Next, a Substitute Bytes transformation is performed on the contents of Tmp and the result is stored in Tmp. Finally, an AddRoundKey transformation is performed on the contents of Tmp and the Round Key which is 0. The AddRoundKey micro-operation is basically a NOP (No OPeration) as an exclusive OR operation is performed on the contents of Tmp and 0 and the result is the contents of Tmp. The combination of the PSHUFB instruction and the AESENCLAST instruction isolates the Substitute Bytes transformation because the AddRoundKey micro-operations perform NOPs, and the other micro-operation (Shift Rows) is commuted by the inverse micro-operation (Inverse Shift Row) performed by the PSHUFB instruction. Thus, the output of the AESENCLAST instruction is Substitute Bytes (State) which is isolated using the combination of the AESENCLAST instruction and the PSHUFB instruction as shown below:

Y=Substitute Bytes (Shift Rows (X))=Substitute Bytes (Shift Rows (Inverse Shift Rows (State)))=Substitute Bytes (State)

Thus, the result of this sequence of instructions including one AES round instruction is the isolated Substitute Bytes transformation.

In another embodiment the Substitute Bytes transformation may be isolated using the following AES instruction:

AESKEYGENASSIST xmm1, xmm2/m128, imm8

The AESKEYGENASSIST instruction is used to assist generation of a round key for a key schedule and operates independent of the size of the key, that is, the same operations are performed irrespective as to whether the key size is 128-bits, 192-bits or 256-bits. The AESKEYGENASSIST instruction performs the "temp=SubWord(RotWord(temp)) xor Rcon[i/Nk]" and the "temp=SubWord(temp)" operations used to generate the FIPS 197 key schedule.

However, instead of operating on one 32-bit word (dword) at a time, the AESKEYGENASSIST instruction performs the operations on four 32-bit words at a time (that is, concurrently on all four dwords (128 bits)) thereby increasing the speed at which the round keys are generated.

The AESKEYGENASSIST instruction provides the result of the following operations:

result:=
[Rot (S-Box4 (X3)) ⊕RCON, S-Box4 (X3), Rot (S-Box4 (X1)) ⊕RCON, S-Box4 (X1)]
where:
X3 [31-0]:=Tmp1 [127-96];
X2 [31-0]:=Tmp1 [95-64];
X1 [31-0]:=Tmp1 [63-32]; and
X0 [31-0]:=Tmp1 [31-0];
and
RCON [7-0]:=imm8[7]imm8[6]imm8[5]imm8[4]
imm8[3]imm8[2]imm8[1]imm8[0]

RotWord (Rot) is a function that takes a four-byte 32-bit dword and performs a cyclic permutation. Rotword takes a dword with four bytes labeled a0-a4 in the order {a0, a1, a2, a3} and performs a cycle permutation to return the four bytes in the order {a1, a2, a3, a0}. The RotWord function is defined in a little Endian convention as:

RotWord X[31-0]=[X[7-0]||X [31-8]],
that is, Rot (x)=(X>>8)|(X<<24);

For example, if X[31-0]='3c4fcf09; RotWord ('3c4fcf09')= ['09'|'3c4fcf')=('093c4fcf')

S-Box4 denotes the application of a single dword S-Box function to 4 dwords, as follows:

S-Box4 (X) [31-0]=[S-Box (X[31-24]), S-Box (X[23-16]), S-Box (X[15-8]), S-Box (X[7-0])].

An S-box is a non-linear substitution table used to perform a one-for-one substitution of a byte value. A SubWord function takes a four-byte input (32-bit word (dword)) and applies an S-box (byte substitution (SubBytes)) to each of the four bytes in the dword to produce a 32-bit output dword The SubWord function (32 bits) results in 4 independent (parallel) SubByte operations (8-bits).

Thus, the substitute bytes transformation may be isolated using the AESKEYGENASSIST instruction with the immediate input (imm8) set to 0 and pre-shuffling the input as follows:

AESKEYGENASSIST xmm1, xmm1, imm8
PSHUFB xmm1, mask

The AESKEYGENASSIST instruction gets rid of the effect of XORing with the rcon and the mask for the PSHUFB instruction is selected to un-rotate the double words numbered 3 and 1.

Figure 7:
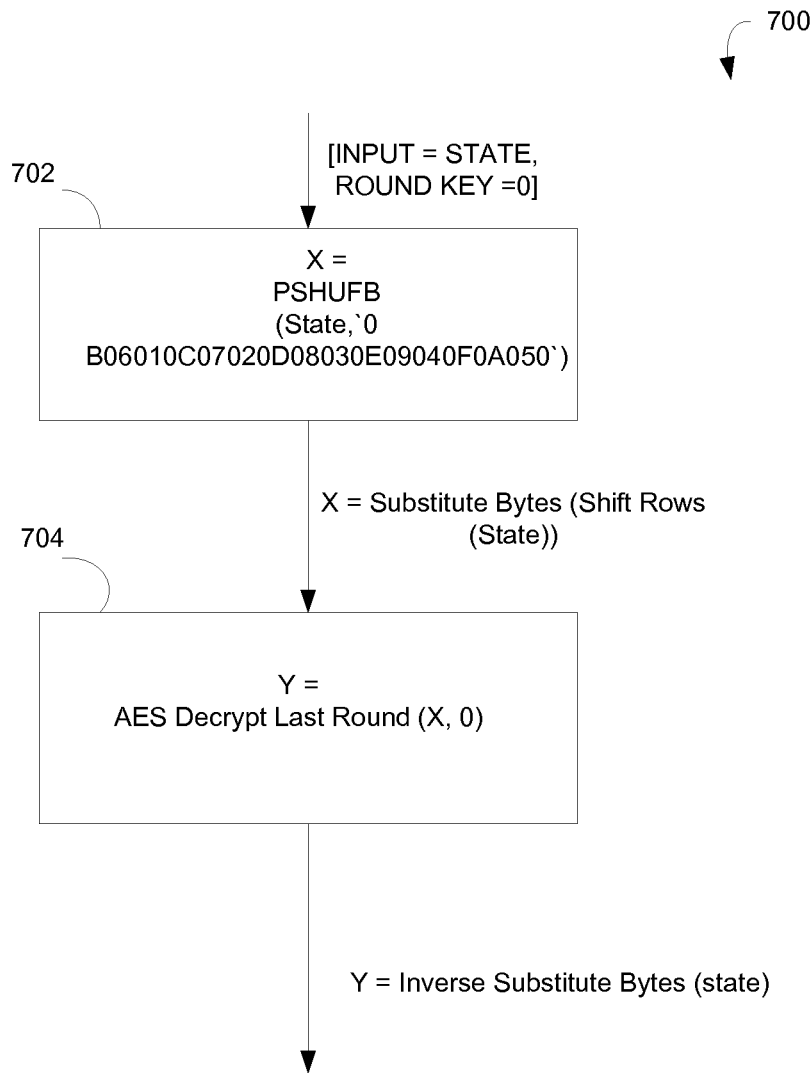
FIG. 7 is a flow chart of an embodiment of an Inverse Substitute Bytes isolation transformation function using at least one AES round instruction for isolating the Inverse Substitute Bytes transformation in the AES algorithm.

FIG. 7 is a flow chart of an embodiment of an Inverse Substitute Bytes isolation transformation function 700 using at least one AES round instruction for isolating the Inverse Substitute Bytes transformation in the AES algorithm.

The micro operation for the Inverse Substitute Bytes transformation is used in the AESDECCLAST instruction shown in Table 5. In the embodiment described in conjunction with FIG. 5, the PSHUFB instruction is used to isolate the Shift Rows transformation.

At block 702, the PSHUFB instruction Substitute Bytes transformation isolation function 600 is called with the B register set to '0B06010C07020D08030E09040F0A0500' to perform a Shift Rows on the state. As discussed earlier in conjunction with FIG. 5, the Shift Rows transformation performs a permutation of bytes of a state stored in a first register based on the corresponding byte position stored in another register.

At block 704, the AESDECLAST instruction in the Substitute bytes transformation isolation function 700 is called with the result (X) of the PSHUFB instruction. The inputs to the AESDECLAST instruction are the result of the PSHUFB instruction and round key set to 0. The AESDECLAST instruction performs the micro-operations shown below in Table 10.

TABLE 10

Tmp = Inverse Shift Rows (X)
Tmp = Inverse Substitute Bytes (Tmp)
Tmp = AddRoundKey (Tmp, Round Key)

First, an Inverse Shift Rows transformation is performed on the input X and the result of the transformation is stored in Tmp. Next, an Inverse Substitute Bytes transformation is performed on the contents of Tmp and the result is stored in Tmp. Finally, an AddRoundKey transformation is performed on the contents of Tmp and the Round Key which is 0. The AddRoundKey micro-operation is basically a NOP (No OPeration) as an exclusive OR operation is performed on the contents of Tmp and 0 and the result is the contents of Tmp. The combination of the PSHUFB instruction and the AESDECLAST instruction isolates the Inverse Substitute Bytes transformation because the AddRoundKey micro-operations perform NOPs, and the other micro-operation (Inverse Shift Rows) is commuted by the micro-operation (Shift Row) performed by the PSHUFB instruction. Thus, the output of the AESDECLAST instruction is Inverse Substitute Bytes (State) which is isolated using the combination of the AESDECLAST instruction and the PSHUFB instruction as shown below:

Y=Inverse Substitute Bytes (Inverse Shift Rows (X))=Inverse Substitute Bytes (Inverse Shift Rows (Shift Rows (State)))=Inverse Substitute Bytes (State)

Thus, the result of this sequence of instructions including at least one AES round instruction is the isolated Inverse Substitute Bytes transformation.

By using the special combinations of the AES round encrypt/decrypt instructions, as described, the AES transformations performed by the AES round encrypt/decrypt instructions may be isolated. This adds flexibility to the usage of the AES instructions because they can be used, for example for constructing AES variants, supporting possible future modifications in the AES standard and/or for using the AES primitives as building blocks to ciphers and cryptographic hash functions. The transformations isolated by the combination of the AES instructions may be used for debugging, validation particularly for full chip and certification purposes.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. A method of performing encryption algorithm, the method comprising:
   combining instructions operable on one or more processors, at least one of the instructions to perform a sequence of transformations, the instructions combined in an order such that when executed the combination of instructions isolates a sub-step transformation in the sequence of transformations, wherein the instructions includes an Advanced Encryption Standard Decription Last (AESDECLAST) round instruction and an Advanced Encryption Standard Encription (AESENC) round instruction, the combination of the AESDECLAST round and the AESENC round instructions isolates a MixColumns sub-step transformation.

2. The method of claim 1, wherein the sequence of transformations performed by the AESDECLAST round instruction includes an Inverse Shift Rows transformation and an Inverse Substitute Bytes transformation and a series of transformations performed by the AESENC round instruction includes a Shift Rows transformation, a Substitute Bytes transformation and the MixColumns sub-step transformation.

3. The method of claim 1, wherein the sequence of transformations performed by the AESENCLAST round instruction includes a Shift Rows transformation and a Substitute Bytes transformation and a series of transformations performed by the AESDEC round instruction includes an inverse Shift Rows transformation, an Inverse Substitute Bytes transformation and the Inverse MixColumns sub-step transformation.

4. The method of claim 1, wherein the combination of instructions include a Packed Shuffle Bytes (PSHUFB) instruction and an Advanced Encryption Standard Encryption Last (AESENCLAST) round instruction, the combination of the PSHUFB and the AESENCLAST round instructions isolates a Substitute Bytes sub-step transformation.

5. The method of claim 4, wherein the sequence of transformations performed by the AESENCLAST round instruction includes a Shift Rows transformation and the Substitute Bytes sub-step transformation and the PSHUFB instruction a performs an inverse Shift Rows transformation.

6. The method of claim 1 wherein the combination of instructions include a Packed Shuffle Bytes (PSHUFB) instruction and an Advanced Encryption Standard Decryption Last (AESDECLAST) round instruction, the combination of the PSHUFB and the AESDECLAST round instructions isolates an Inverse Substitute Bytes sub-step transformation.

7. The method of claim 6, wherein the sequence of transformations performed by the AESDECLAST round instruction includes an Inverse Shift Rows transformation and the Inverse Substitute Bytes sub-step transformation and the sequence of transformation performed by the PSHUFB instruction includes a Shift Rows transformation.

8. The method of claim 1, wherein the sub-step transformation includes transformations from a group of Shift Rows, Inverse Shift Rows, Substitute Bytes, Inverse Substitute Bytes, MixColumns and Inverse Mix Columns that are defined by Federal Information Processing Standard (FIPS) 197.

9. An apparatus comprising:
   memory to store instructions, at least one of the instructions to perform a sequence of transformations, and
   a processor including an execution unit, the instructions stored in an order in the memory such that when a combination of instructions is executed by the execution unit, the execution unit provides a result of a sub-step transformation in the sequence of transformations, wherein the instructions includes an Advanced Encryption Standard Decription Last (AESDECLAST) round instruction and an Advanced Encryption Standard Encription (AESENC) round instruction, the combination of the AESDECLAST round and the AESENC round instructions provides a MixColumns sub-step transformation.

10. The apparatus of claim 9, wherein the combination of the AESENCLAST round and the AESDEC round instructions provides an Inverse MixColumns sub-step transformation.

11. The apparatus of claim 9, wherein the instructions include a Packed Shuffle Bytes (PSHUFB) instruction and an Advanced Encryption Standard Encryption Last (AESENCLAST) round instruction, the combination of the PSHUFB and the AESENCLAST instructions provides a Substitute Bytes sub-step transformation.

12. The apparatus of claim 9, wherein the instructions include a Packed Shuffle Bytes (PSHUFB) instruction and an Advanced Encryption Standard Decryption Last (AESDECLAST) round instruction, the combination of the PSHUFB and the AESDECLAST instructions provides an Inverse Substitute Bytes sub-step transformation.

13. The apparatus of claim 9, wherein the sub-step transformations includes transformations from a group of Shift Rows, Inverse Shift Rows, Substitute Bytes, Inverse Substitute Bytes, MixColumns and Inverse Mix Columns that are defined by Federal information Processing Standard (FIPS) 197.

14. A non-transitory machine-accessible medium having associated information, wherein the information, when accessed, results in a machine performing:
combining a plurality of instructions, at least one of the instructions to perform a sequence of transformations, the instructions combined in an order such that when executed the combination of instructions isolates a sub-step transformations in the sequence of transformations, wherein the sub-step transformations includes transformations from a group of Shift Rows, Inverse Shift Rows, Substitute Bytes, Inverse Substitute Bytes, MixColumns and Inverse Mix Columns defined by Federal Information Processing Standard (FIPS) 197.

* * * * *

UNITED STATES PATENT AND TRADEMARK OFFICE
CERTIFICATE OF CORRECTION

PATENT NO.        : 8,879,725 B2  
APPLICATION NO.   : 12/040214  
DATED             : November 4, 2014  
INVENTOR(S)       : Shay Gueron et al.

Page 1 of 1

It is certified that error appears in the above-identified patent and that said Letters Patent is hereby corrected as shown below:

On Title page 2, Item (56) under "OTHER PUBLICATIONS", in column 1, line 10, delete "XP007910936." and insert -- XP007919936. --, therefor.

On Title page 2, Item (56) under "OTHER PUBLICATIONS", in column 1, line 11, delete "Repor" and insert -- Report --, therefor.

On Title page 2, Item (56) under "OTHER PUBLICATIONS", in column 2, line 21, delete "Offce" and insert -- Office --, therefor.

In the Claims

In column 13, line 49, In Claim 1, delete "Decription" and insert -- Decryption --, therefor.

In column 13, line 51, In Claim 1, delete "Encription" and insert -- Encryption --, therefor.

In column 14, line 43, In Claim 9, delete "Decription" and insert -- Decryption --, therefor.

In column 14, line 45, In Claim 9, delete "Encription" and insert -- Encryption --, therefor.

In column 15, line 11, In Claim 14, delete "transformations" and insert -- transformation --, therefor.

In column 15, line 12, In Claim 14, delete "transformations" and insert -- transformation --, therefor.

Signed and Sealed this  
Twenty-fourth Day of February, 2015

Michelle K. Lee  
*Deputy Director of the United States Patent and Trademark Office*